Dec. 22, 1964 A. JANSONS 3,162,773

TRANSISTORIZED LINEAR ALTERNATING CURRENT SERVO COMPENSATOR AND QUADRATURE REJECTOR

Filed Sept. 5, 1961

INVENTOR.

Arnolds Jansons,

BY

H. H. Losche

Attorneys.

United States Patent Office 3,162,773
Patented Dec. 22, 1964

3,162,773

TRANSISTORIZED LINEAR ALTERNATING CURRENT SERVO COMPENSATOR AND QUADRATURE REJECTOR

Arnolds Jansons, Indianapolis, Ind., assignor to the United States of America as represented by the Secretary of the Navy Filed Sept. 5, 1961, Ser. No. 136,114
11 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to the compensation of an alternating current servo system, such as used for radar antenna drives or others using modulated suppressed carrier alternating current as an electrical signal carrier. More particularly this invention relates to an alternating current demodulation, quadrature rejection, compensation, and modulation circuit in which transistorized synchronously operating signal sampling switches and regular noncarrier type servo compensating networks produce the desired servo compensation transfer function.

In prior known similar devices the modulation and demodulation is accomplished using vacuum tubes where the storage elements of the servo compensating network, such as capacitors or inductors, are not disconnected during the time between the sampling of alternating current (A.C.) signal peak values. At the lower impedance levels required for the transistorized version, the servo compensator network capacitors become large in capacitance as well as in size. In some other similar devices the output A.C. wave shape is distorted especially during fast input signal changes. This distortion or ripple in the output A.C. wave shape, when not filtered out, saturates the servo amplifier, and when it is filtered out to avoid saturation, the speed of response and the bandwidth of the servo system is reduced.

In this invention a transistorized demodulator, modulator, and servo compensating circuit is incorporated between the preamplifier and power amplifier of a servo system. The preamplifier output is transformer coupled to a transistor demodulator and quadrature rejector network switched in synchronism with the alternating current creating the error signal to produce phase sensitive rectified error voltage. This demodulated error signal is applied to a regular noncarrier type servo compensation network whose storage elements, such as capacitors or inductors, are coupled to transistorized switches. These switches synchronously connect the storage elements to the applied demodulated error signal, twice per cycle of the transistor demodulator and quadrature rejector network, to produce error voltage samples at the crest values of the A.C. having the proper characteristics for servo compensation purpose. These error voltage samples are summed with a demodulated A.C. voltage generated by the servo system tachometer, when so desired, and the summed voltage key-modulated by a transistorized modulator circuit simultaneously providing the demodulation of the A.C. tachometer signal as well as to produce an A.C. output signal to the power amplifier of the servo system. The keying-modulator is synchronously driven with the demodulator and transistorized switches in the compensation network and its signal output to the servo power amplifier is provided by a transformer having its primary shunted by a capacitor whereby the transformer-capacitor combination can be pre-tuned to produce a sine wave or square wave signal for the servo system power amplifier, as desired. The circuit of this invention is readily adaptable to utilize a single synchronizing supply source or separate transformer coupled supply sources for the demodulation, switching, and modulation operations. It is therefore a general object of this invention to provide a transistorized linear A.C. servo compensator and quadrature rejector circuit having sampling type of operation with signal applied only for a fraction of full cycle to enable the use of smaller storage elements in the compensator network and to maintain the highest speed of operation possible without any additional filtering.

These and other objects and the attendant advantages, features, and uses may become more apparent to those skilled in the art as the description proceeds when considering the accompanying drawing, in which.

FIGURE 1 EMBODIMENT

Figure 1:
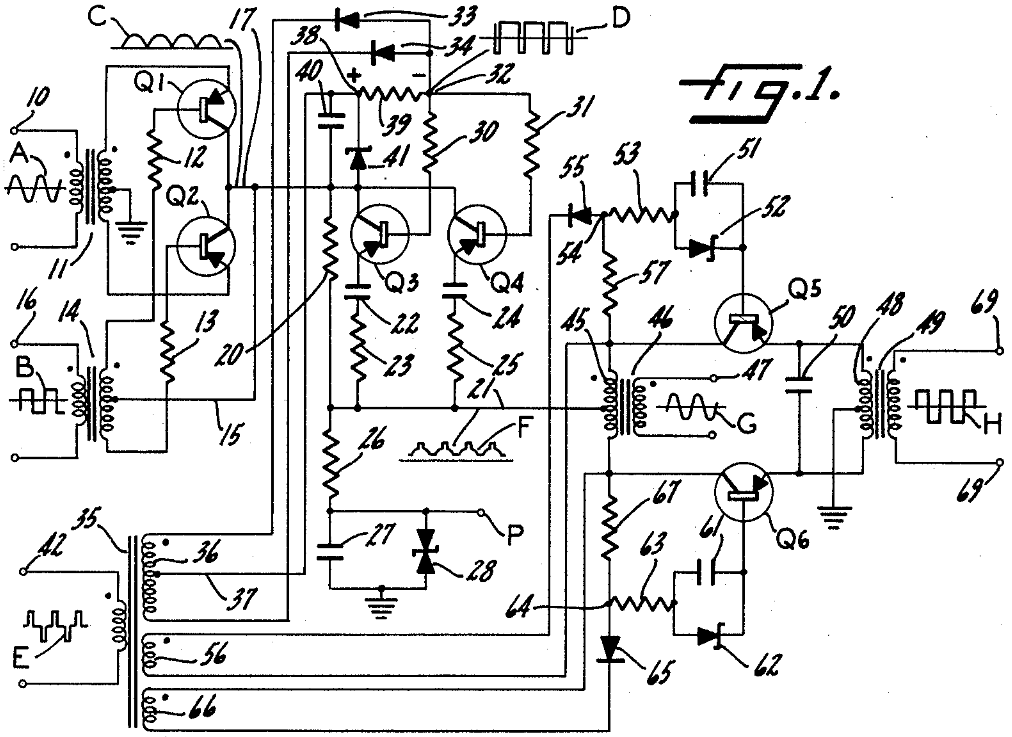
FIGURE 1 is a circuit schematic diagram of one embodiment of the invention.

Referring more particularly to FIGURE 1 the servo system error voltage coming from the preamplifier is applied at terminals 10 to the primary of a transformer 11, the secondary of which is center-tapped to ground. The error voltage is applied in the form of a modulated sine wave A which is produced from a transducer fed by the servo system driving voltage supply which, for the purpose of example herein, may be 400 cycle supply voltage, as well understood by those skilled in the servo art. The transformer 11 is polarized as shown by the dots and the two secondary output leads are coupled respectively to the emitters of a pair of transistors $Q_1$ and $Q_2$, the collectors of which are coupled in common. The transistors $Q_1$ and $Q_2$ are operated in push-pull relation for sampling the amplitude swings of the error voltage input A. The transistors $Q_1$ and $Q_2$ each have the base thereof coupled through a resistance 12 and 13, respectively, to the opposite leads of the secondary of a transformer 14 which is center-tapped with the center tap coupled through a conductor means 15 to the common coupling of the collectors of transistors $Q_1$ and $Q_2$. The primary winding of transformer 14 is coupled to input terminals 16 which receives a square wave voltage B produced from the same source as the servo system driving voltage source to cause the square wave voltage to be in synchronism and in phase with the same source in the servo system producing the error voltage A. The square wave voltage B may be produced by clipping the servo system driving voltage source such as the 400 cycle voltage hereinbefore stated. The operation of the transistors $Q_1$ and $Q_2$ in push-pull relation produce a demodulation and quadrature rejection of the input error voltage signal A to produce phase sensitive rectified error voltage represented by the waveform C on the common collector output of transistors $Q_1$ and $Q_2$. This collector output is applied to the output conductor 17 of the demodulator and quadrature rejection circuit.

The output of transistors $Q_1$ and $Q_2$ over the output conductor 17 is applied directly to the collectors of a pair of parallel connected switching transistors $Q_3$ and $Q_4$ in a servo compensating network. The common collector coupling of transistors $Q_3$ and $Q_4$ is coupled through a resistance 20 to an output conductor 21. The emitter of transistor $Q_3$ is coupled through a storage capacitor 22 and a resistance 23 to the output conductor 21 and the parallel coupling of transistor $Q_4$ is through a similar storage capacitor 24 and resistor 25 in series to the output conductor 21. The common coupling of the resistor 20 and the emitter resistors 23 and 25 of transistors $Q_3$ and $Q_4$ on the output conductor 21 is coupled through a resistance 26 and a storage capacitor 27 to a fixed potential such as ground. The capacitor 27 is paralleled by a double Zener diode 28, when so desired, to limit the voltage excursions on the capacitor 27 in both positive and negative amplitudes. Where the compensation circuit of this invention is desired to be current responsive more than voltage responsive, an inductance may be substituted for the capacitor 27. The servo compensating network, when so desired, can be fed by an additional positive or negative voltage or voltage pulse of desired amplitude applied to the terminal P connected to the junction of resistor 26, capacitor 27, and double Zener diode 28. This means of applying positive or negative direct current voltages or pulses to the terminal P to reduce certain servo transient and velocity errors is better described in my patent application Serial No. 97,705 (1960 series), filed March 22, 1961, entitled "Servo Mechanism Transient and Velocity Error Compensation Means." The bases of transistors $Q_3$ and $Q_4$ are coupled respectively through base biasing resistors 30 and 31 to a common terminal point 32. The common terminal point 32 is coupled through a diode 33 to one secondary output lead of a secondary winding 36 in a transformer 35 and also through a diode 34 to the opposite lead of the secondary winding 36 of transformer 35. The secondary winding 36 of transformer 35 is center-tapped, the center tap of which is coupled through a lead 37 to a terminal 38, the terminals 38 and 32 being coupled through a high impedance resistor 39. The terminal 32 with respect to the common collector coupling of transistors $Q_3$ and $Q_4$ will thus have the wave D applied thereto. The terminal 38 is coupled in parallel through a capacitor 40 and a Zener diode 41 to the common collector terminals of transistors $Q_3$ and $Q_4$ to produce collector cutoff bias for these transistors. The diodes 33 and 34 are both oriented in the same direction with their anodes coupled in common to the terminal 32 and their cathodes coupled respectively to the two output leads of the secondary winding 36 of transformer 35. The primary winding of transformer 35 is coupled to input terminals 42 to receive alternate positive and negative voltage pulses E of a frequency derived from the servo system voltage source, such as the 400 cycle voltage source. This pulsed voltage may be obtained by using a linear inductance in series with a square loop magnetic amplifier transformer or any other well-known means to supply the pulsed voltage waveform E shown herein. The voltage D between the terminal point 32 and collectors of transistors $Q_3$ and $Q_4$ controls the transistor switches $Q_3$ and $Q_4$ in synchronism with the error signal voltage A connecting together the servo compensating network, comprised of resistors 20, 25, 26, and 23, and capacitors 22, 24, and 27 at the crest value of the signal voltage A for a small fraction of its half-cycle. Since the demodulating voltage B and the sampling voltage E applied to the transformers 14 and 35 are in synchronism with the voltage applied to the servo system (not shown) to produce the error voltage A, the control voltage D applied to the switching transistors $Q_3$ and $Q_4$ will go negative each half cycle at the crest values of signal A and switch the transistors $Q_3$ and $Q_4$ "on." While two transistors $Q_3$ and $Q_4$ are shown in parallel, it is to be understood that only one such transistor may be used, or more than two used in parallel, depending on the current requirements of the compensator.

The compensated error voltage pulses appearing on the output conductor 21 during the crest values of signal A and shown by waveform F when error signal A amplitude is rising are applied to the center tap of a secondary winding 45 in a transformer 46, the primary of which has terminals 47 adapted to receive the output voltage from a tachometer (not shown) in the servo system. The tachometer is driven from the same 400 cycle source as is used to drive the servo system to produce a sine wave voltage represented by G. The tachometer sine wave voltage G is summed by virtue of connection of the network output lead 21 and the transformer 46, one output lead of the secondary being directly coupled to the collector of a transistor $Q_5$ and the other output lead of the secondary 45 being directly coupled to the collector of a transistor $Q_6$. The transistors $Q_5$ and $Q_6$ are included in a keying-modulator network, the output of which is taken from the emitters thereof to the opposite leads of a primary winding 48 of an output transformer 49, the primary 48 of which is center-tapped to ground. The emitters of transistors $Q_5$ and $Q_6$ have a capacitor 50 coupled in parallel thereto. The base of transistor $Q_5$ is coupled in parallel through a capacitor 51 and a Zener diode 52 in series with a resistor 53 to a terminal 54. Terminal 54 is coupled through a diode 55 to one output lead of a secondary winding 56 in the transformer 35, the other output lead of secondary 56 being coupled directly to the collector of transistor $Q_5$. The collector of transistor $Q_5$ is coupled to the terminal 54 through a collector biasing resistor 57. The base of transistor $Q_5$ has a cutoff bias placed thereon by virtue of the resistor 53, capacitor 51, and Zener diode 52. The base of transistor $Q_6$ is connected in parallel through a capacitor 61 and a Zener diode 62 in series with a resistor 63 to a terminal point 64. The terminal 64 is coupled through a diode 65 to a secondary 66 of transformer 35, the opposite lead of which is coupled directly to the collector of transistor $Q_6$. Terminal 64 is coupled through a resistor 67 to the collector of transistor $Q_6$ to provide biasing collector potential for this transistor. The resistor 63 in series with the parallel coupled capacitor 61 and Zener diode 62 provide base cutoff bias voltage for transistor $Q_6$. The diodes 55 and 65 are oriented such that their anodes are coupled to the terminals 54 and 64, respectively, and the cathodes are coupled to the secondary windings 56 and 66, respectively. The secondary of the output transformer 49 is coupled to output terminals 69 which output terminals may be coupled to the power amplifier of the servo system to apply compensated alternating current voltage through the power amplifier to drive the servo system in a direction to reduce the input error voltage A to zero. The output voltage is a square wave H whose amplitude and phase, 90° or 270°, with respect to signal A.C. error voltage A, is determined by the error signal A, the servo compensating network, and the second input G in such a way as to drive the servo system in the direction to reduce the error voltage A to zero.

OPERATION OF FIGURE 1

In the operation of the embodiment in FIGURE 1, the input to terminals 10 of the error voltage A is produced basically from the same servo driving voltage source which produces the demodulating waveform B and pulses E on terminals 16 and 42. The transistors $Q_1$ and $Q_2$, operated in push-pull by virtue of the application of the synchronizing sampling voltage B applied to the bases thereof, produce the phase sensitive rectified voltage C on the collector output 17. The output voltage C is positive when voltages A and B are out of phase and negative when A and B are in phase. For phase relations of A and B between the in-phase condition or the out-of-phase condition, the output C signal will approach zero. The average value of C will be zero when A and B are phased 90° or 270° apart. The compensation circuit transistor switches $Q_3$ and $Q_4$ connect the servo compensating network 20, 22, 23, 24, 25, 26, and 27 by the sampling voltage E twice each cycle at the crest values of the demodulated voltage C to produce at the output terminal 21 during this time an error control signal F properly modified by the compensating network. Voltage signals B and E stay in-phase since they come from the same voltage source. In case A and B are 90° or 270° out-of-phase, the instantaneous value of signal C will be zero at the sampling time of signal E. By virtue of this the quadrature component of signal A will be rejected. This means that signals F and H will not contain the signal A quadrature component. The sampling voltage E switches transistors $Q_3$ and $Q_4$ to charge and discharge or recharge the capacitors 22 and 24 to the amount of the instantaneous value of signal C at the sampling instants. As the sampled voltage rises in amplitude, the increase in sampled voltage amplitude is merely added to the voltage on these capacitors from the previous sample and, likewise, when the next voltage sample is lower than the last voltage sample stored on the capacitors 22 and 24, the charge on these capacitors will be discharged down to the new sampled voltage amplitude through the switching transistors $Q_3$ and $Q_4$. This is true since current can flow either way through switching transistors $Q_3$ and $Q_4$ once they are biased "on." The signal amplitude on capacitor 27 is limited by the double Zener diode 28, when so desired. If it is desirable to reduce certain servo transient and velocity errors, a voltage or a pulse can be applied to the terminal P from a source by a method more fully described in the prior mentioned patent application. The compensator output voltage F is summed in the transformer 46 with the tachometer voltage G and the output voltage of transformer 46 is applied to the collectors of transistors $Q_5$ and $Q_6$. The transistors $Q_5$ and $Q_6$, driven in synchronism from the transformer 35, operate as a quadrature rejection network for the tachometer voltage G and as a modulator for the summed voltage charging up the capacitor 50 to produce the square wave voltage H on the output of transformer 49. The amplitude and phase of this output voltage H is determined by the phase relation of the compensator error voltage on the output 21 of the compensator circuit with respect to the tachometer voltage G. If this phase relation changes, the phase and amplitude of the output voltage H will change. That is, the output voltage H is a result of the sum, or difference, of compensator error voltage F and tachometer voltage G at the instants of sampling determined by the sampling voltage E. Since the compensated error voltage F is determined by the error signal A, the signal H amplitude and phase is determined by the amplitude and phase relationship of A and G. When signal A is either zero or is 90° or 270° out-of-phase with signal B, the output signal H will have an amplitude proportional to the signal G only. The output voltage H could be changed to a sine wave, where desirable, by pre-tuning the capacitor 50 and transformer 49 to produce such a sine wave output. By this circuit arrangement the capacitor size of the capacitors 22 and 24 can be greatly reduced from those used in the prior known transistorized versions of circuits or vacuum tube circuits. Where it is necessary to reduce the size of capacitor 27 as well or for other reasons, a modified circuit shown in FIGURE 2 can be used.

FIGURE 2 EMBODIMENT

Figure 2:
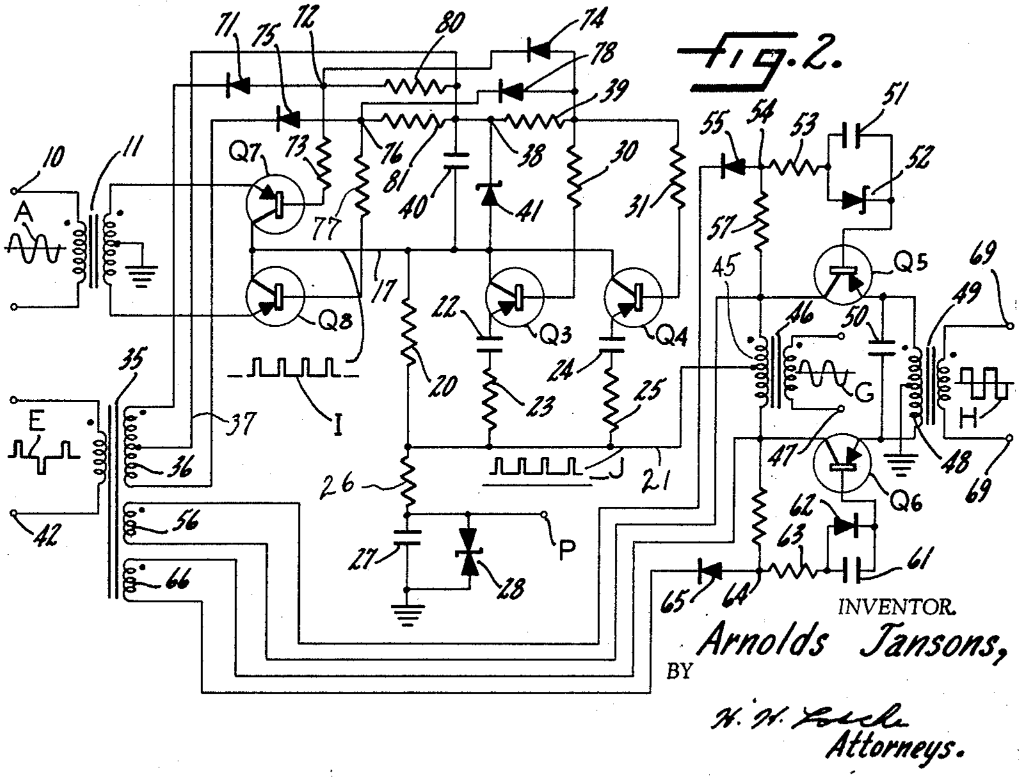
FIGURE 2 is a circuit schematic diagram of another embodiment of the invention.

Referring more particularly to FIGURE 2, wherein like reference characters are applied to like parts, this embodiment is an illustration of the manner of reducing the circuit of FIGURE 1 by the elimination of the transformer 14 and having the functions thereof provided by the transformer 35. The secondary 36 of transformer 35 has one output winding coupled through a diode 71 to a terminal 72 this terminal being coupled through a base bias resistance 73 to the base of a transistor $Q_7$ and also through a diode 74 to the terminal 32. The other output lead of the secondary 36 is coupled through a diode 75 to a terminal 76, which provides base bias voltage through the bias resistors 77 to the base of a transistor $Q_8$ and also through a diode 78 to the terminal 32. Terminal 72 is coupled through a resistor 80 to the terminal 38 and the terminal 76 is coupled through resistor 81 to the terminal 38 to provide transistor cutoff bias voltage through the capacitor 40 and Zener diode 41 to the collectors of transistors $Q_3$ and $Q_4$. The center tap of the secondary winding 36 is connected by the conductor 37 to terminal 38. In this manner the synchronizing positive and negative pulses E are operative through the diodes 71 and 75 and the corresponding resistors 73 and 77 to cause push-pull operation of the transistors $Q_7$ and $Q_8$ which are emitter coupled to the secondary of transformer 11 in the same manner as shown and described for transistors $Q_1$ and $Q_2$ in the embodiment of FIGURE 1. Likewise, the positive and negative pulses E are applied through the diodes 74 and 78 to terminal 32 which produce voltage pulses on the bases of transistors $Q_3$ and $Q_4$ for switching purposes. In this embodiment the output of the common collectors of transistors $Q_7$ and $Q_8$ on the conductor 17 will not be a rectified voltage as shown by the waveform C in FIGURE 1 but will be positive or negative pulses herein illustrated as positive pulses I. Likewise, the voltage waveform on the conductor 21 will now appear as J for a rising error signal A amplitude. If the positive and negative pulses applied to the terminals 42 are, for example, 80 microseconds wide, the pulses I and J on the output conductors 17 and 21, respectively, of the error voltage A will be 80 microseconds wide.

OPERATION OF FIGURE 2

The operation of the embodiment shown in FIGURE 2 is substantially the same as that described for FIGURE 1 except in FIGURE 2 the capacitor 27 providing the lag-lead servo compensation characteristic can be of smaller value and the signal voltage J at network output terminal 21 is of different shape.

While many modifications and changes may be made in the constructional details of the circuit components of this invention to provide signal voltages for particular servo applications or to adapt the circuit for current servo system control, it is to be understood that I desire to be limited only by the scope of the appended claims.

I claim:

1. A linear alternating current servo compensator and quadrature rejector circuit utilizing electronic controlled devices for alternating current servo systems comprising: a first error signal input adapted to be produced by a servomotor of a servo system; means demodulating said error signal; a servo compensating network with switching means therein coupled to said demodulating means to receive said demodulated error signals, said switching means being coupled to connect and disconnect servo compensating network elements to produce compensated servo error signal output; a second signal input adapted to be produced by a tachometer of the servo system; means combining said compensated error signal output of said compensating network with said second signal input to produce a servo control signal; and means to key modulate the servo control signal to obtain an alternating signal with the phase determined by the polarity of the servo control signal whereby said output signal is effective and adaptive to drive a servomotor of the servo system in a direction to reduce said error signal to zero.

2. A linear alternating current servo compensator and quadrature rejector circuit for alternating current servo systems comprising: a first alternating current error voltage input adapted to be produced by the servomotor of a servo system; means demodulating said error voltage; a servo compensating network with switching means therein coupled to said demodulating means, said switching means being constructed and arranged to connect and disconnect servo compensating network storage elements to produce compensated servo error voltage; a second alternating current voltage input adapted to be produced by a tachometer of the servo system; summing means coupled to said servo compensating network to receive said compensated servo error voltage and to said second alternating current voltage input to receive same for summing said second input and servo compensated error voltages to produce a servo control voltage; key-modulating means coupled to said summing means for modulating the summed voltages to produce a modulated alternating current output servo control voltage, with the phase thereof determined by the polarity of said servo control voltage; and means synchronizing the demodulating means, said switching means, and said key-modulating means with voltage creating said alternating current error voltage whereby said modulated servo control voltage output is of a phase and amplitude to control a servo system to reduce said servo error voltage to zero.

3. A linear alternating current servo compensator and quadrature rejector circuit as set forth in claim 2 wherein said demodulating means, said switching means, and said key-modulating means include semi-conductor switching networks switched by said synchronizing means.

4. A linear alternating current servo compensator and quadrature rejector circuit as set forth in claim 3 wherein said semiconductor demodulating means consists of a pair of transistors having the servo error voltage applied to the emitters thereof, the means synchronizing the demodulating means coupled to the transistor bases, and the output thereof taken from the collectors thereof to function as a phase sensitive demodulator and quadrature rejector in push-pull relation.

5. A linear alternating current servo compensator and quadrature rejector circuit as set forth in claim 4 wherein said servo compensating network coupled to said demodulating means includes at least one transistor switched by said synchronizing means to switch said switching means twice each cycle to develop the servo compensating network output compensated servo error voltage.

6. A linear alternating current servo compensator and quadrature rejector circuit as set forth in claim 5 wherein said summing means and key-modulating means provide modulation and quadrature rejection for the second voltage input and includes a transformer and a pair of transistors, said transformer having a center-tapped secondary with the center tap coupling the output of said transistor servo compensating network and the secondary end leads coupling one each of said transistor collectors, the primary of said transformer constituting said second input, the emitters of said transistors providing said modulated alternating current output control voltage, and said bases coupled to said synchronizing means.

7. A transistorized linear alternating current servo compensator and quadrature rejector circuit for alternating current servo systems comprising: a first alternating current error voltage input adapted to be produced by the servomotor of a servo system; a demodulator and quadrature rejector network coupled to said error voltage input to produce demodulated, quadrature rejected error voltage on an output thereof; a compensating network coupled to the output of said demodulator and quadrature rejector network, said compensating network having a transistor switching means to connect and disconnect servo compensating network storage elements to establish servo compensating lead-lag characteristics of said first error voltage, and said servo compensating network also having a storage element connected to a fixed potential producing the lag-lead compensation characteristics of said first error voltage shunted by a Zener diode to limit the stored voltage amplitude with an output taken from said storage elements; a second alternating current voltage input adapted to be produced by a tachometer of the servo system; a summing network coupled to the output of said servo compensating network and to said second voltage input to sum same on an output thereof; a modulator network coupled to the output of said summing network providing modulation and quadrature rejection of the summed voltage to produce an alternating current on an output thereof; and a synchronizing means coupled to said demodulator and quadrature rejector network, said switching means of said compensating network, and said modulator network for synchronizing the demodulation of said demodulator and quadrature rejection network, said switching means, and said modulator and quadrature rejector network whereby said alternating current on said output is a servo control voltage of reversible phase and varying amplitude adapted to drive a servo system to reduce said first input servo error voltage to zero.

8. A transistorized linear alternating current servo compensator and quadrature rejector circuit as set forth in claim 7 wherein said transistor switching means of said servo compensating network coupled to the output of said demodulator and quadrature rejection network includes at least one semiconductor having a control and two conduction electrodes with one of said two conduction electrodes being coupled to said output of said demodulator and quadrature rejection network, with the control electrode coupled to said synchronizing means, and with the other of said two conduction electrodes coupling capacitive storage means in said compensating network, and said switching and capacitive storage means being coupled in series with a resistance and these coupled in parallel with a resistance to said one of said two conduction electrodes for providing said lead-lag characteristics of said servo compensating network.

9. A transistorized linear alternating current servo compensator and quadrature rejector circuit as set forth in claim 8 wherein said summing network includes an input transformer having a primary coupled to receive said second alternating current voltage input and having a center-tapped secondary, the center tap of which is coupled to receive the output of said compensating network; and wherein said modulating network includes a pair of semiconductors each having a base, an emitter, and a collector, said collectors being coupled respectively to the leads of said input transformer secondary, said bases being coupled to said synchronizing means, and said emitters being coupled to an output transformer primary center-tapped to ground and shunted by a storage capacitor for modulating the servo control voltage output whereby said semiconductors are alternately switched to produce an alternating servo control voltage.

10. A transistorized linear alternating current servo compensator and quadrature rejector circuit as set forth in claim 9 wherein said demodulator and quadrature rejector network includes a pair of transistors having their emitters coupled to the leads of a center-tapped transformer secondary having the primary thereof coupled to said error voltage input, their collectors coupled in common constituting said output, and their bases coupled to said synchronizing means to produce alternate conduction of said transistors.

11. A transistorized linear alternating current servo compensator and quadrature rejector circuit as set forth in claim 10 wherein said synchronizing means is coupled to said demodulator, servo compensating, and modulator networks through diode couplers to prevent current reversals.

References Cited by the Examiner

UNITED STATES PATENTS

| | | | |
|---|---|---|---|
| 2,632,872 | 3/53 | Warsher | 318—30 |
| 2,996,677 | 8/61 | Marcy | 328—166 X |
| 3,030,552 | 4/62 | Fennick | 328—166 |
| 3,045,156 | 7/62 | Losher | 328—166 X |

OTHER REFERENCES

Servomechanism Practice, W. R. Ahrend, McGraw-Hill, New York, 1954, page 117, FIGURE 8–3.

ARTHUR GAUSS, *Primary Examiner.*

ORIS L. RADER, *Examiner.*